United States Patent
Chen et al.

(10) Patent No.: US 12,087,011 B2
(45) Date of Patent: Sep. 10, 2024

(54) OBJECT POSITIONING METHOD AND SYSTEM

(71) Applicant: PEGATRON CORPORATION, Taipei (TW)

(72) Inventors: Cheng-Chou Chen, Taipei (TW); Chia-Ching Liao, Taipei (TW); An-Chu Hsiao, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 399 days.

(21) Appl. No.: 17/700,885

(22) Filed: Mar. 22, 2022

(65) Prior Publication Data
US 2022/0366602 A1   Nov. 17, 2022

(30) Foreign Application Priority Data
May 12, 2021 (TW) ................. 110117042

(51) Int. Cl.
*G06T 7/73* (2017.01)
*G06T 3/40* (2006.01)
(52) U.S. Cl.
CPC ................. *G06T 7/73* (2017.01); *G06T 3/40* (2013.01); *G06T 2207/20016* (2013.01); *G06T 2207/20084* (2013.01)
(58) Field of Classification Search
CPC .... G06T 7/70; G06T 7/73; G06T 7/74; G06T 7/75; G06T 2207/20081;
(Continued)

(56) References Cited

U.S. PATENT DOCUMENTS

2019/0139216 A1   5/2019   Georgescu et al.
2022/0147751 A1*  5/2022   Vitek .................. G06F 18/2163
(Continued)

FOREIGN PATENT DOCUMENTS

CN   108510062 A   9/2018
CN   108629265 A   10/2018
(Continued)

OTHER PUBLICATIONS

Haldar, Supratim. "How to stop training a neural-network using callback?" Towards Data Science, Mar. 18, 2019. <https://towardsdatascience.com/neural-network-with-tensorflow-how-to-stop-training-using-callback-5c8d575c18a9>. (Year: 2019).*

*Primary Examiner* — Geoffrey E Summers
(74) *Attorney, Agent, or Firm* — Li & Cai Intellectual Property (USA) Office (57) ABSTRACT

The disclosure discloses an object positioning method and system. The object positioning method includes: acquiring an original object image including a to-be-positioned object; demagnifying the original object image; inputting a demagnified object image to a rough-positioning model for identification, to determine a plurality of rough feature positions; acquiring a plurality of image blocks from the original object image according to the rough feature positions; inputting the image blocks to a precise-positioning model for identification, to determine a plurality of precise feature positions; and determining a position of the to-be-positioned object in the original object image.

22 Claims, 9 Drawing Sheets (58) Field of Classification Search
CPC . G06T 2207/20084; G06T 2207/20016; G06T 3/40; G06T 3/4007; G06T 3/4023; G06T 3/4046; G06V 10/82; G06N 3/02–0985
See application file for complete search history.

(56) References Cited

U.S. PATENT DOCUMENTS

2022/0277475 A1* 9/2022 Zhou ...................... G06V 40/11
2023/0024671 A1* 1/2023 Kim ........................ G06T 15/20

FOREIGN PATENT DOCUMENTS

| CN | 109447053 A | 3/2019 |
| CN | 109753866 A | 5/2019 |
| CN | 111340087 A | 6/2020 |

\* cited by examiner

OBJECT POSITIONING METHOD AND SYSTEM

TECHNICAL FIELD

The disclosure relates to an object positioning method and system, and in particular, to an object positioning method and system meeting real-time and high-precision requirements.

BACKGROUND

Due to the demands of intelligent manufacturing, manufacturers must ensure that a positioning performance on the production line are precise to their needs. In a conventional object positioning method, pattern recognition software is usually used to capture an edge of an object in an image for detection. However, the method is very susceptible to the external environment, and is likely to cause great errors depending on the different resolutions of inputted images. In addition, the complexity and the resolution of the images are also required to be considered. Otherwise, the processing speed is likely to be excessively small.

In addition, although laser positioning is available, the speed is relatively small during implementation, and at present, the method is applicable to detection and positioning of only objects having small areas.

Furthermore, machine learning is available for object detection. However, when a high-resolution image is required to be used and a high precision is also required, machine learning fails to meet both of the two requirements as a result of limitations of a depth of a machine learning model and memory resources of a graphic processing unit (GPU). For example, an excessively large depth of the machine learning model causes a failure of convergence, and a high resolution is likely to cause insufficient memories.

SUMMARY

The disclosure is to provide an object positioning method and system meeting real-time and high-precision requirements. The method includes the following steps. An original object image including a to-be-positioned object is acquired. The original object image is demagnified to generate a demagnified object image. The demagnified object image is inputted to a rough-positioning model for identification, to determine a plurality of rough feature positions. A plurality of image blocks are acquired from the original object image according to the rough feature positions. The image blocks are inputted to a precise-positioning model for identification, to determine a plurality of precise feature positions, and a position of the to-be-positioned object in the original object image is determined according to the precise feature positions. A precision of the rough-positioning model is within a first error range, and a precision of the precise-positioning model is within a second error range. The first error range is greater than the second error range. The first error range and the second error range are used as training completion conditions in a first training process of the rough-positioning model and a second training process of the precise-positioning model respectively.

Furthermore, the disclosure is to provide an object positioning system. The system includes a calculation device and an image capture module. The calculation device includes a processor and a memory. The memory is configured to store a rough-positioning model and a precise-positioning model. The image capture module is configured to acquire an original object image including a to-be-positioned object, and transmit the original object image to the calculation device. The processor is configured to: demagnify the original object image to generate a demagnified object image; input the demagnified object image to the rough-positioning model for identification, to determine a plurality of rough feature positions; acquire a plurality of image blocks from the original object image according to the rough feature positions; input the image blocks to the precise-positioning model for identification, to determine a plurality of precise feature positions; and determine a position of the to-be-positioned object in the original object image according to the precise feature positions. A precision of the rough-positioning model is within a first error range, and a precision of the precise-positioning model is within a second error range. The first error range is greater than the second error range. The first error range and the second error range are used as training completion conditions in a first training process of the rough-positioning model and a second training process of the precise-positioning model respectively.

One of the beneficial effects of the disclosure is as follows: According to the object positioning method and system provided in the disclosure, different training policies are used for the rough-positioning model and the precise-positioning model. Therefore, both a high efficiency and a high precision can be achieved by serially connecting the rough-positioning model to the precise-positioning model. In addition, the rough-positioning model and the precise-positioning model adopt a same model architecture and a same training image source. Therefore, the training of the model can be further simplified, and the complexity of the model can be further reduced, thereby reducing the costs.

For further understanding of features and technical content of the disclosure, refer to the following detailed description and drawings related to the disclosure. However, the provided drawings are merely for reference and description, and are not intended to limit the disclosure.

DETAILED DESCRIPTION

The following are specific embodiments to illustrate the implementation of "OBJECT POSITIONING METHOD AND SYSTEM" disclosed in the disclosure, and a person skilled in the art can understand the advantages and effects of the disclosure as disclosed herein. The invention can also be implemented or applied through other different specific embodiments, and various details in the specification can also be modified or changed based on different viewpoints and applications without departing from the idea of the disclosure. In addition, the accompanying drawings of the disclosure are for simple schematic illustration only and are not depicted according to actual dimensions, as stated in advance. The following embodiments will further detail the related technical contents of the disclosure, but the disclosure is not intended to limit the scope of protection of the disclosure. In addition, the term "or" as used herein may include any one or a combination of related listed items depending on the circumstances.

Figure 1:
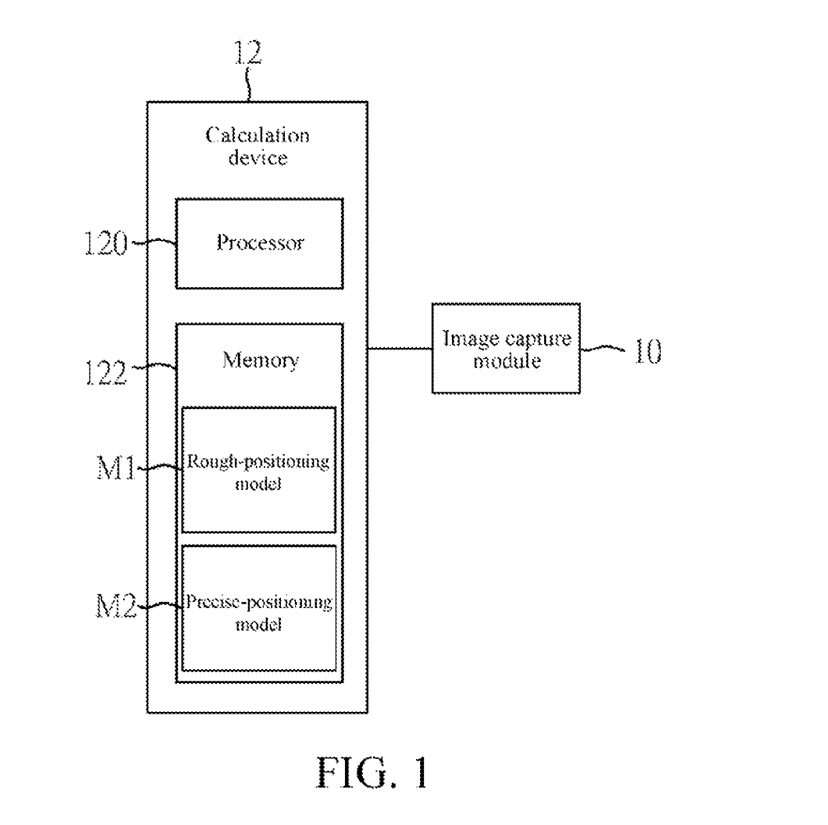
FIG. 1 is a functional block diagram of an object positioning system according to an embodiment of the disclosure.

FIG. 1 is a functional block diagram of an object positioning system according to an embodiment of the disclosure. Referring to FIG. 1, an embodiment of the disclosure provides an object positioning system 1. The object positioning system includes an image capture module 10 and a calculation device 12.

The calculation device 12, for example, is a desktop computer, a notebook computer, a smart phone, a tablet computer, a game console, an e-book, a set-top box, a smart television, or the like. The calculation device 12 includes a processor 120 and a memory 122. The calculation device 12 may have a display, such as a liquid crystal display (LCD), a light-emitting diode (LED) display, a field emission display (FED), an organic light-emitting diode (OLED), or displays of other types.

The memory 122 may be configured to store data such as images, program codes, and software modules, and may be, for example, any type of fixed or removable random access memory (RAM), read-only memory (ROM), flash memory, or hard disk, or other similar devices, integrated circuits, and combinations thereof. In this embodiment, the memory 122 stores a rough-positioning model M1 and a precise-positioning model M2.

The processor 120 is, for example, a central processing unit (CPU), or other programmable general-purpose or special-purpose microprocessors, a digital signal processor (DSP), a programmable controller, an application specific integrated circuit (ASIC), a programmable logic device (PLD), a graphics processing unit (GPU), or other similar devices or a combination of the devices. The processor 120 may execute the program codes, the software modules, the instructions, and the like stored in the memory 122 to implement the object positioning method in the embodiments of the disclosure.

The image capture module 10 may be, for example, one or more video cameras, cameras, or the like, and may be communicatively connected to the calculation device 12. The image capture module 10 is configured to acquire an original object image I0 including a to-be-positioned object O1, and transmit the original object image to the calculation device 12.

Figure 2:
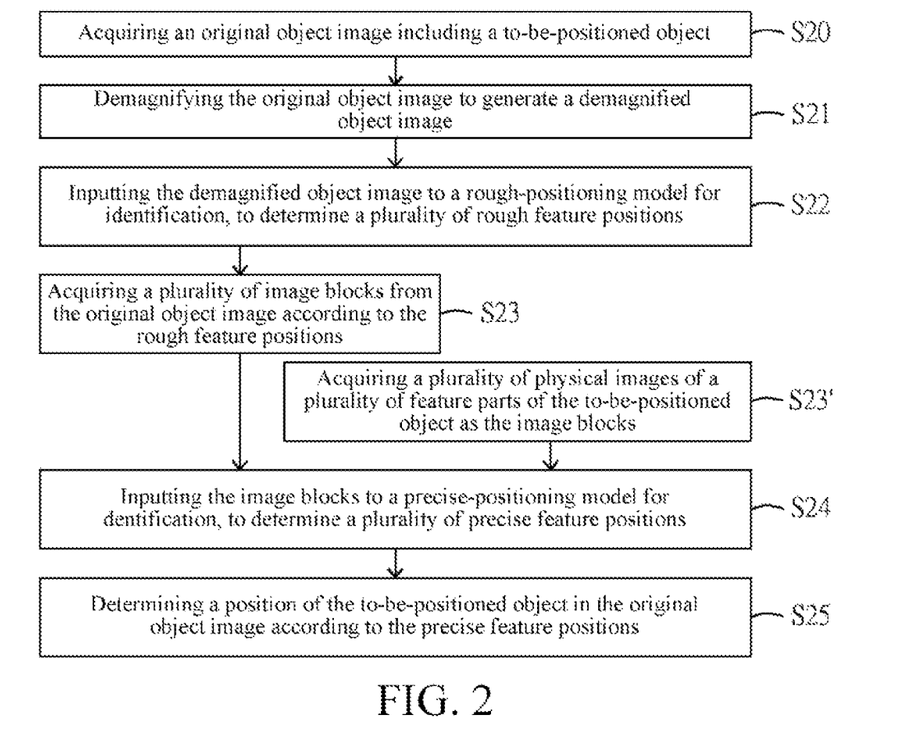
FIG. 2 is a flowchart of an object positioning method according to an embodiment of the disclosure.
Figure 3:
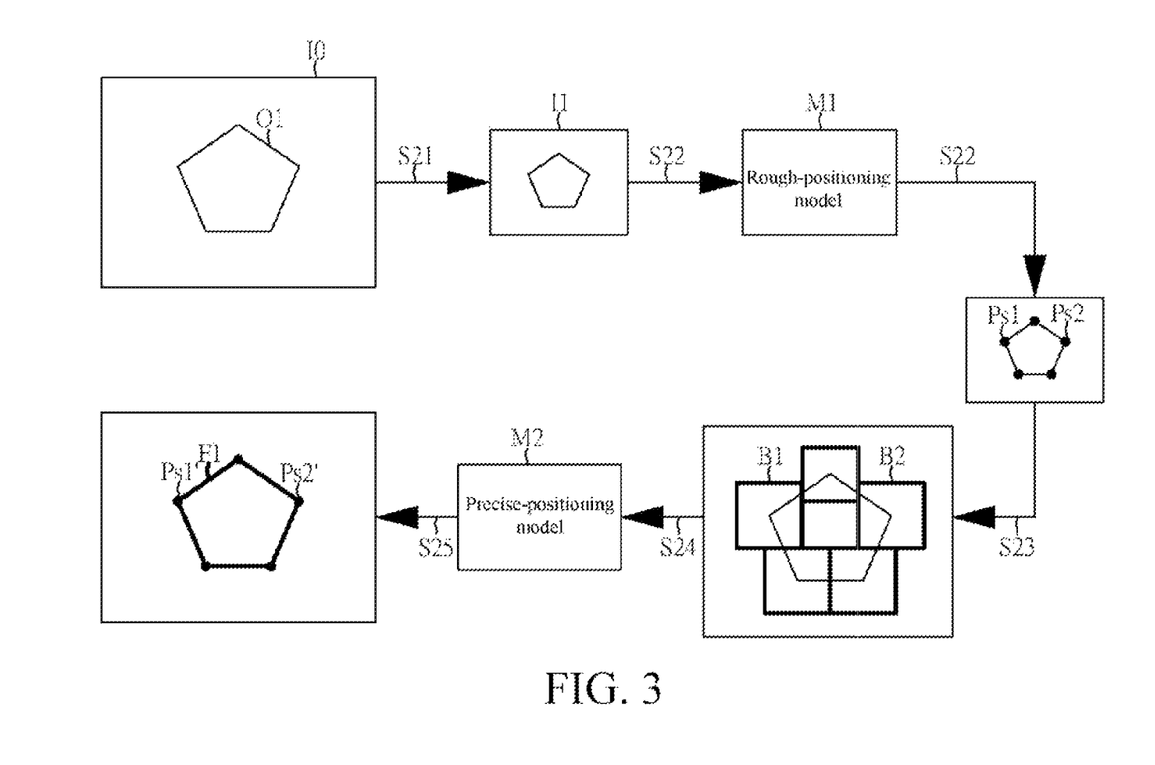
FIG. 3 is a schematic flowchart of the object positioning method according to an embodiment of the disclosure.

FIG. 2 is a flowchart of an object positioning method according to an embodiment of the disclosure. FIG. 3 is a schematic flowchart of the object positioning method according to an embodiment of the disclosure. Referring to FIG. 2 and FIG. 3, the object positioning method mentioned in this embodiment is applicable to the object positioning system 1 in the above embodiments. Specific steps of the object positioning method in this embodiment are described below with the various elements in the object positioning system 1.

As shown in the figure, the object positioning method may include the following steps performed by the processor 120:

Step S20: Acquiring the original object image I0 including the to-be-positioned object O1. For example, the original object image I0 may be an image having a high resolution, for example, a resolution more than 5 million pixels.

Step S21: Demagnifying the original object image I0 to generate a demagnified object image I1. Specifically, during subsequent execution of the rough-positioning model M1, the demagnified object image I1 is merely used for determining rough positions of features of the to-be-positioned object O1. Therefore, a model with a smaller scale and a smaller depth may be used, and processing may be performed with few operation resources.

Step S22: Inputting the demagnified object image to a rough-positioning model for identification, to determine a plurality of rough feature positions.

Figure 4:
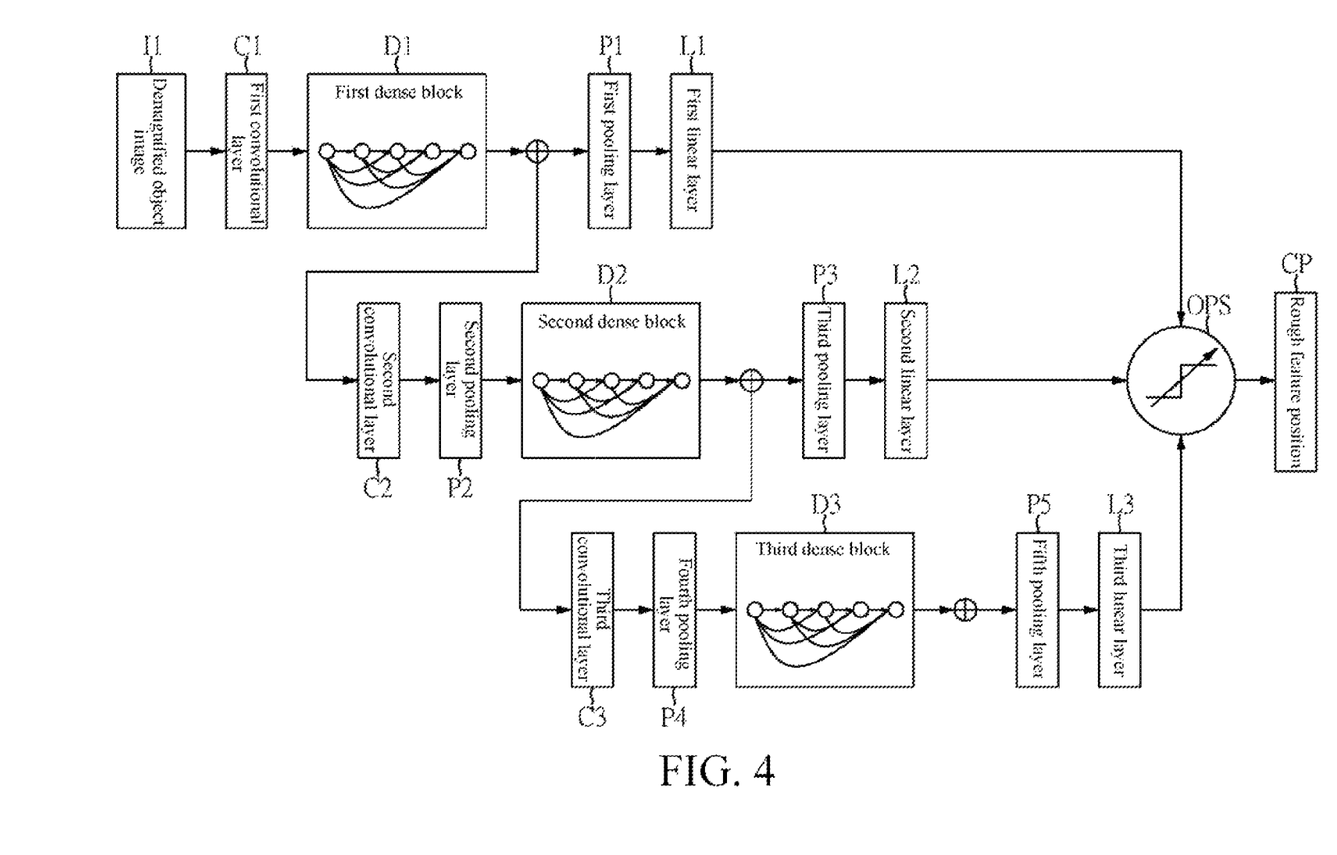
FIG. 4 is an architecture diagram of a rough-positioning model according to an embodiment of the disclosure.

Referring to FIG. 4, FIG. 4 is an architecture diagram of a rough-positioning model according to an embodiment of the disclosure. In some embodiments, the rough-positioning model M1 may be, for example, a first densely connected convolution network (DenseNet) model, which is an adaptive DenseNet model modified mainly based on a conventional DenseNet.

As shown in FIG. 4, the first DenseNet model includes a first convolutional layer C1, a first dense block D1 connected to the first convolutional layer C1, a first pooling layer P1 connected to the first dense block D1, a first linear layer L1 connected to the first pooling layer P1, a second convolutional layer C2, where an output of the first dense block D1 is used as an input of the second convolutional layer, a second pooling layer P2 connected to the second convolutional layer C2, a second dense block D2 connected to the second pooling layer P2, a third pooling layer P3 connected to the second dense block D2, a second linear layer L2 connected to the third pooling layer P3, a third convolutional layer C3, where an output of the second dense block D2 is used as an input of the third convolutional layer, a fourth pooling layer P4 connected to the third convolutional layer C3, a third dense block D3 connected to the fourth pooling layer P4, a fifth pooling layer P5 connected to the third dense block D3, a third linear layer L3 connected to the fifth pooling layer P5, and an optimization selector OPS. Outputs of the first linear layer L1, the second linear layer L2, and the third linear layer L3 are used as an input of the optimization selector OPS, and the optimization selector is configured to execute a regression operation.

The first convolutional layer C1 is used as an initial convolutional layer, and is configured to perform initial feature extraction on an inputted image (for example, the demagnified object image I1). In addition, a transition layer is disposed between different dense blocks. For example, a transition layer formed by the second convolutional layer C2 and the second pooling layer P2 is configured to reduce a dimensionality of a feature map outputted by the first dense block D1 to further reduce parameter quantities.

Figure 5:
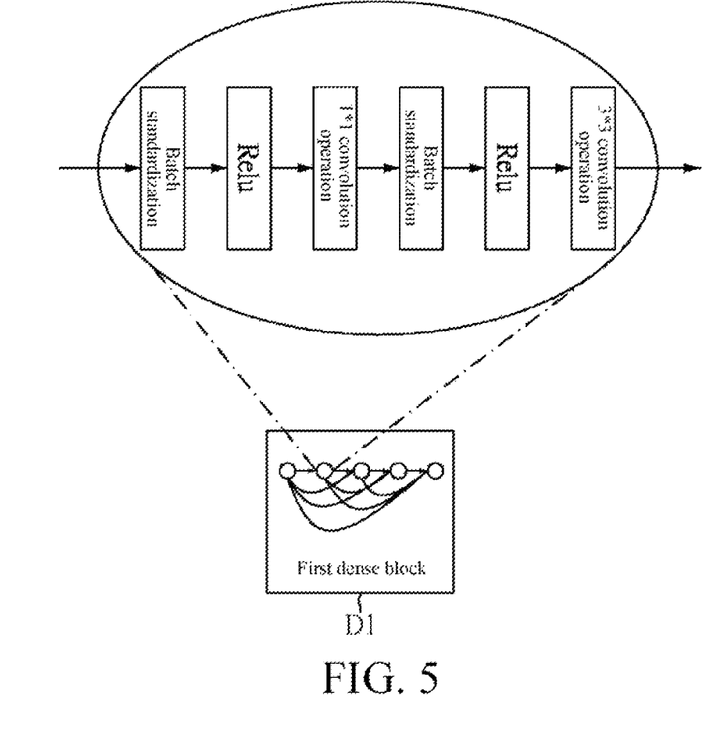
FIG. 5 is a schematic diagram of a detailed architecture of a first dense block according to the disclosure.

Further referring to FIG. 5, FIG. 5 is a schematic diagram of a detailed architecture of a first dense block according to the disclosure. It is to be noted that, the first dense block D1, the second dense block D2, and the third dense block D3 have a substantially same architecture. For example, the first dense block D1 includes a plurality of layers. An output of each of the layers is used as an input of each following layer. The layers each are configured to perform a batch standardization operation, a rectified linear unit (ReLU) operation, a 1*1 convolution operation, the batch standardization operation, the ReLU operation, and a 3*3 convolution operation.

By means of the dense blocks, a conventional DenseNet model architecture has advantages such as a narrow network and few parameters. Therefore, although the conventional DenseNet model is further modified in the disclosure, the dense blocks are retained. In the dense blocks, each convolutional layer outputs very few feature maps (less than 100 feature maps), and the connection manners of the convolutional layers enable more effective feature and gradient transmission. Therefore, the model can be more easily trained.

In addition, the first DenseNet model further includes classification layers configured to classify extracted features. For example, in FIG. 3, the classification layers are formed by the pooling layers and the linear layers, for example, a classification layer formed by the first pooling layer P1 and the first linear layer L1, a classification layer formed by the third pooling layer P3 and the second linear layer L2, and a classification layer formed by the fifth pooling layer P5 and the third linear layer L3.

After the classification layers classify the extracted features, the optimization selector OPS executes a regression operation on a classification result to determine a most probable feature position as a rough feature position CP. The precision of the rough-positioning model M1 is within a first error range. For example, the precision may have an error less than 20 pixels.

Step S23: Acquiring a plurality of image blocks from the original object image according to the rough feature positions. For example, the rough feature position may be, for example, coordinate points Ps1 and Ps2 in the demagnified object image I1. After mapping the coordinates to coordinates in the original object image I0, a predetermined area may be extended by using the coordinates as a reference to acquire a plurality of image blocks (for example, image blocks B1 and B2 shown in FIG. 3).

Figure 6:
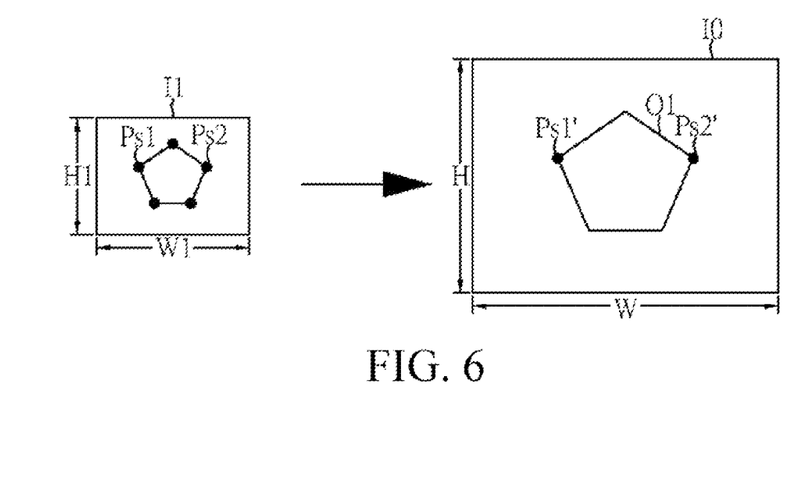
FIG. 6 is a schematic diagram showing mapping of coordinates of a demagnified object image to coordinates of an original object image according to an embodiment of the disclosure.

Further referring to FIG. 6, FIG. 6 is a schematic diagram showing mapping of coordinates of a demagnified object image to coordinates of an original object image according to an embodiment of the disclosure. As shown in FIG. 6, a size of the original object image I0 is defined as width W*height H, and a size of the demagnified object image I1 is defined as width W1*height H1. After the rough-positioning model M1 acquires the coordinate points Ps1 and Ps2, the coordinates may be mapped to the original object image I0 to obtain coordinate points Ps1' and Ps2'.

Figure 7:
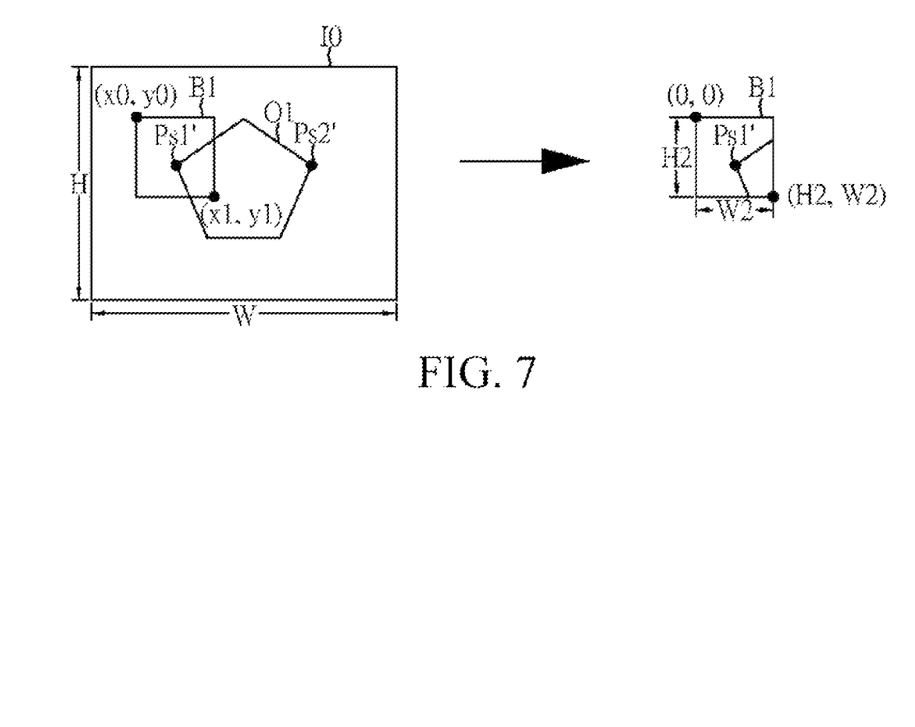
FIG. 7 is a schematic diagram showing acquisition of a plurality of image blocks according to rough feature positions according to an embodiment of the disclosure.

Next, referring to FIG. 7, FIG. 7 is a schematic diagram showing acquisition of a plurality of image blocks according to rough feature positions according to an embodiment of the disclosure. As shown in FIG. 7, in step S23, the image block B1 having a width of W2 and a height of H2 may be cut out by means extension by using coordinates (x, y) of the acquired coordinate point Ps1' in the original object image I0 as a center. In the original object image I0 at a left part of FIG. 7, coordinates are respectively (x0, y0) and (x1, y1) from upper left to lower right, where x1=x0+W1, and y1=y0+H1.

In this embodiment, during the cutting of the image block B1, only a position of the reference point (x0, y0) in the original object image I0 is recorded. After the cutting, a reference point at an upper left corner of the image block B1 is set as (0, 0). When the reference point is required to be mapped to the original object image I0, coordinate points in the original map can be obtained merely by adding (x0, y0) to the coordinate point Ps1'.

In addition, compared with the original object image I0, the image blocks B1 and B2 are obviously smaller. Therefore, in this step, the image required to be calculated may be further demagnified, thereby improving the calculation efficiency and reducing required operation resources.

Optionally, in other embodiments, the image capture module 10 may further include a plurality of image capture devices (cameras or video cameras). The object positioning method may include the following steps. Step S23': Acquiring a plurality of physical images of a plurality of feature parts of the to-be-positioned object O1 as the image blocks.

Step S24: Inputting the image blocks BN to a precise-positioning model M2 for identification, to determine a plurality of precise feature positions PP. A precision of the precise-positioning model M2 may be within a second error range less than the first error range. For example, the precision may have an error less than 3 pixels.

In this embodiment, the precise-positioning model M2 may be, for example, a second DenseNet model, and has a same architecture as the first DenseNet model. Therefore, repeated descriptions are omitted herein. Since the rough-positioning model and the precise-positioning model adopt the same model architecture, the training of the model can be further simplified, and the complexity of the model can be further reduced, thereby reducing the costs. For example, a plurality of GPUs may run in parallel to reduce the deployment time.

It is to be noted that, the rough-positioning model M1 is configured to determine rough positions of a plurality of target features of a target object as the rough feature positions by means of a first training process, and the precise-positioning model M2 is configured to determine precise positions of the plurality of target features of the target object as the precise feature positions by means of a second training process.

Figure 8:
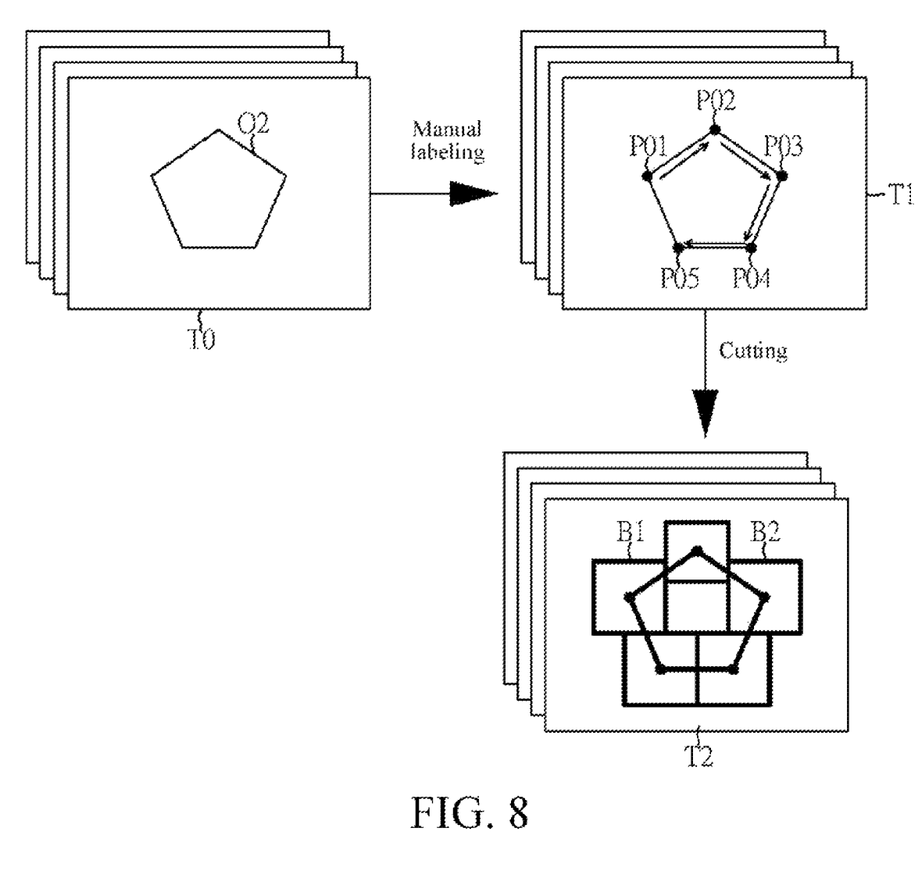
FIG. 8 is a schematic diagram of a training image generation and input process according to an embodiment of the disclosure.

For example, referring to FIG. 8, FIG. 8 is a schematic diagram of a training image generation and input process according to an embodiment of the disclosure. As shown in the figure, a batch of initial training image sets T0 are provided. The initial training image sets all include a target object O2. Next, positioning points such as P01, P02, P03, P04, and P05 may be manually labeled in sequence by using auxiliary labeling software, to generate a plurality of first training images T1. Specifically, the expression "labeling" means extracting feature positions (that is, vertex coordinates of polygons) of target objects to label the first training images T1. The labeled coordinates are extracted, and predetermined areas are extended by using the coordinates as a center, to obtain a plurality of image blocks (in a manner similar to that in FIG. 7). In addition, the original labeled coordinates are converted into coordinates in the image blocks to generate second training images T2.

Further, the first training process means performing data enhancement on the above initial processing image sets T0 and using the initial processing image sets as an input, using the labeled first training images T1 as an expected output of the rough-positioning model M1, and using the first error range as a training completion condition in the first training process. During training, the efficiency of the rough-positioning model M1 is evaluated, until the efficiency passes an efficiency test, that is to say, the rough-positioning model is qualified to determine the rough feature positions in the above steps.

The second training process means performing data enhancement on the above initial processing image sets T0 and using the initial processing image sets as an input, using the labeled second training images T2 as an expected output of the precise-positioning model M2, and using the second error range as a training completion condition in the second training process. During training, the efficiency of the precise-positioning model M2 is evaluated, until the efficiency passes an efficiency test, that is to say, the precise-positioning model is qualified to determine the precise feature positions in the above steps.

In the disclosure, different training policies are used for the rough-positioning model and the precise-positioning model. Therefore, both a high efficiency and a high precision can be achieved by serially connecting the rough-positioning model to the precise-positioning model.

Step S25: Determining a position of the to-be-positioned object O1 in the original object image I0 according to the precise feature positions. For example, as shown in FIG. 3, a precise position of the to-be-positioned object O1 represented by an outer frame F1 can be determined.

In a specific embodiment, since all to-be-positioned objects O1 are polygon objects, an inputted image block Br may cover only partial features (such as, vertexes). However, the precise feature positions PP may be extracted, and then precise positions of remaining features may be determined by determining angles.

Figure 9:
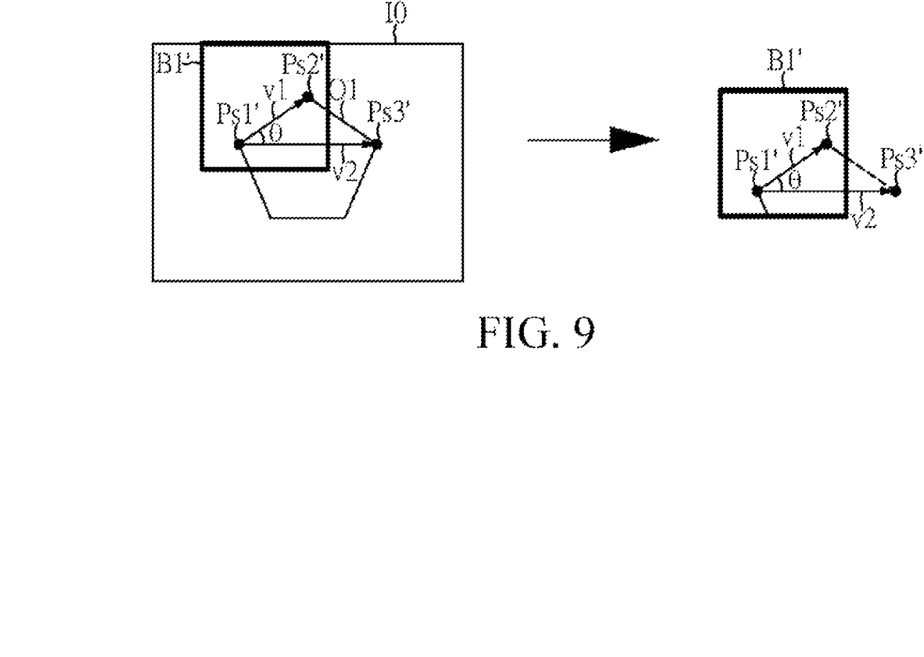
FIG. 9 is a schematic diagram of an angle calculation manner and determination of remaining feature positions according to an embodiment of the disclosure.

Further referring to FIG. 9, FIG. 9 is a schematic diagram of an angle calculation manner and determination of remaining feature positions according to an embodiment of the disclosure. For example, as shown in FIG. 9, the to-be-positioned object O1 is a polygon. The coordinate point Ps1 in FIG. 9 may be used as an original point to calculate a vector v1 of the coordinate points Ps1' and Ps2' and a vector v2 of the coordinate points Ps1' and Ps3', and calculate an included angle θ between the obtained vectors v1 and v2. Therefore, when the precise feature positions PP (for example, the coordinate points Ps1' and Ps2') are determined from the image block B1' shown at a right part of FIG. 9, a position of the coordinate point Ps3' may be determined according to the included angle θ and the vectors v1 and v2. Similarly, a plurality of vectors formed by five points, as well as the included angles formed by the vectors can be calculated. Therefore, when the inputted image block covers only partial features, the positions of the remaining features may be inferred inversely.

[Beneficial Effects of the Embodiments]

One of the beneficial effects of the disclosure is as follows: According to the object positioning method and system provided in the disclosure, different training policies are used for the rough-positioning model and the precise-positioning model. Therefore, both a high efficiency and a high precision can be achieved by serially connecting the rough-positioning model to the precise-positioning model. In addition, the rough-positioning model and the precise-positioning model adopt a same model architecture and a same training image source. Therefore, the training of the model can be further simplified, and the complexity of the model can be further reduced, thereby reducing the costs.

Since the content disclosed above is merely preferred feasible embodiments of the disclosure and does not hereby limit claims of the disclosure, all equivalent technical changes made by using the specification and the drawings of the disclosure are included in the claims of the disclosure.

What is claimed is:

1. An object positioning method, comprising:
   acquiring an original object image comprising a to-be-positioned object;
   demagnifying the original object image to generate a demagnified object image;
   inputting the demagnified object image to a rough-positioning model for identification, to determine a plurality of rough feature positions;
   acquiring a plurality of image blocks from the original object image according to the rough feature positions;
   inputting the image blocks to a precise-positioning model for identification, to determine a plurality of precise feature positions; and
   determining a position of the to-be-positioned object in the original object image according to the precise feature positions, wherein
   a precision of the rough-positioning model is within a first error range, and a precision of the precise-positioning model is within a second error range, wherein the first error range is greater than the second error range, and the first error range and the second error range are used as training completion conditions in a first training process of the rough-positioning model and a second training process of the precise-positioning model respectively.

2. The object positioning method according to claim 1, wherein the rough-positioning model is a first densely connected convolution network (DenseNet) model, and comprises:
   a first convolutional layer;
   a first dense block, connected to the first convolutional layer;
   a first pooling layer, connected to the first dense block;
   a first linear layer, connected to the first pooling layer;
   a second convolutional layer, wherein an output of the first dense block is used as an input of the second convolutional layer;
   a second pooling layer, connected to the second convolutional layer;
   a second dense block, connected to the second pooling layer;
   a third pooling layer, connected to the second dense block;
   a second linear layer, connected to the third pooling layer;
   a third convolutional layer, wherein an output of the second dense block is used as an input of the third convolutional layer;
   a fourth pooling layer, connected to the third convolutional layer;
   a third dense block, connected to the fourth pooling layer;
   a fifth pooling layer, connected to the third dense block;
   a third linear layer, connected to the fifth pooling layer; and
   an optimization selector, wherein outputs of the first linear layer, the second linear layer, and the third linear layer are used as an input of the optimization selector, and the optimization selector is configured to execute a regression operation.

3. The object positioning method according to claim 2, wherein the precise-positioning model is a second DenseNet model, and has a same architecture as the first DenseNet model.

4. The object positioning method according to claim 2, wherein the first dense block, the second dense block, and the third dense block each comprise a plurality of layers, wherein an output of each of the layers is used as an input of each following layer, and the layers each are configured to perform a batch standardization operation, a rectified linear unit (ReLU) operation, a 1*1 convolution operation, the batch standardization operation, the ReLU operation, and a 3*3 convolution operation.

5. The object positioning method according to claim 1, further comprising: configuring a plurality of image capture devices to acquire a plurality of physical images of a plurality of feature parts of the to-be-positioned object as the image blocks.

6. The object positioning method according to claim 1, wherein the first error range is 20 pixels, and the second error range is 3 pixels.

7. The object positioning method according to claim 1, wherein the rough-positioning model is configured to determine rough positions of a plurality of target features of a target object as the rough feature positions by means of the first training process, wherein a plurality of first training images is used as an input of the first training process, and a plurality of labeled first training images is used as an expected output of the rough-positioning model.

8. The object positioning method according to claim 7, wherein the labeled first training images are a plurality of labeled results obtained by labeling positions of the target features of the target object in the first training images.

9. The object positioning method according to claim 8, wherein the precise-positioning model is configured to determine precise positions of the plurality of target features of the target object as the precise feature positions by means of the second training process, wherein a plurality of second training images is used as an input of the second training process, and labeled second training images are used as an expected output of the precise-positioning model.

10. The object positioning method according to claim 9, wherein the labeled second training images are second training images obtained by segmenting the first training images according to the labeled results, and coordinate conversion is performed on the labeled results of the first training images to label the target features of the target object and precise positions thereof in the second training images.

11. The object positioning method according to claim 10, further comprising:
calculating a plurality of vectors and a plurality of included angles among the vectors according to the labeled precise positions; and
after the precise feature positions are determined, determining the position of the to-be-positioned object in the original object image according to the precise feature positions, the vectors, and the included angles.

12. An object positioning system, comprising:
a calculation device, comprising:
a processor; and
a memory, storing a rough-positioning model and a precise-positioning model; and
an image capture module, configured to acquire an original object image comprising a to-be-positioned object, and transmit the original object image to the calculation device, wherein
the processor is configured to:
demagnify the original object image to generate a demagnified object image;
input the demagnified object image to the rough-positioning model for identification, to determine a plurality of rough feature positions;
acquire a plurality of image blocks from the original object image according to the rough feature positions;
input the image blocks to the precise-positioning model for identification, to determine a plurality of precise feature positions; and
determine a position of the to-be-positioned object in the original object image according to the precise feature positions, wherein
a precision of the rough-positioning model is within a first error range, and a precision of the precise-positioning model is within a second error range, wherein the first error range is greater than the second error range, and the first error range and the second error range are used as training completion conditions in a first training process of the rough-positioning model and a second training process of the precise-positioning model respectively.

13. The object positioning system according to claim 12, wherein the precise-positioning model is a first densely connected convolution network (DenseNet) model and comprises:
a first convolutional layer;
a first dense block, connected to the first convolutional layer;
a first pooling layer, connected to the first dense block;
a first linear layer, connected to the first pooling layer;
a second convolutional layer, wherein an output of the first dense block is used as an input of the second convolutional layer;
a second pooling layer, connected to the second convolutional layer;
a second dense block, connected to the second pooling layer;
a third pooling layer, connected to the second dense block;
a second linear layer, connected to the third pooling layer;
a third convolutional layer, wherein an output of the second dense block is used as an input of the third convolutional layer;
a fourth pooling layer, connected to the third convolutional layer;
a third dense block, connected to the fourth pooling layer;
a fifth pooling layer, connected to the third dense block;
a third linear layer, connected to the fifth pooling layer; and
an optimization selector, wherein outputs of the first linear layer, the second linear layer, and the third linear layer are used as an input of the optimization selector, and the optimization selector is configured to execute a regression operation.

14. The object positioning system according to claim 13, wherein the precise-positioning model is a second DenseNet model, and has a same architecture as the first DenseNet model.

15. The object positioning system according to claim 13, wherein the first dense block, the second dense block, and the third dense block each comprise a plurality of layers, wherein an output of each of the layers is used as an input of each following layer, and the layers each are configured to perform a batch standardization operation, a rectified linear unit (ReLU) operation, a 1*1 convolution operation, the batch standardization operation, the ReLU operation, and a 3*3 convolution operation.

16. The object positioning system according to claim 12, wherein the image capture module further comprises a plurality of image capture devices configured to acquire a plurality of physical images of a plurality of feature parts of the to-be-positioned object as the image blocks.

17. The object positioning system according to claim 12, wherein the first error range is 20 pixels, and the second error range is 3 pixels.

18. The object positioning system according to claim 12, wherein the rough-positioning model is configured to determine rough positions of a plurality of target features of a target object as the rough feature positions by means of the first training process, wherein a plurality of first training images is used as an input of the first training process, and a plurality of labeled first training images is used as an expected output of the rough-positioning model.

19. The object positioning system according to claim 18, wherein the labeled first training images are a plurality of labeled results obtained by labeling positions of the target features of the target object in the first training images.

20. The object positioning system according to claim 19, wherein the precise-positioning model is configured to determine precise positions of the plurality of target features of the target object as the precise feature positions by means of the second training process, wherein a plurality of second training images is used as an input of the second training process, and labeled second training images are used as an expected output of the precise-positioning model.

21. The object positioning system according to claim 20, wherein the labeled second training images are second training images obtained by segmenting the first training images according to the labeled results, and coordinate conversion is performed on the labeled results of the first training images to label the target features of the target object and precise positions thereof in the second training images.

22. The object positioning system according to claim 21, wherein the processor is further configured to:
- calculate a plurality of vectors and a plurality of included angles among the first vectors according to the labeled precise positions; and
- after the precise feature positions are determined, determine the position of the to-be-positioned object in the original object image according to the precise feature positions, the vectors, and the included angles.

\* \* \* \* \*